VARIABLE LENGTH ACCUMULATOR IN A DATA PROCESSING SYSTEM

Filed April 14, 1965

DATA PROCESSING SYSTEM

INVENTORS.
RICHARD A. BOENNIGHAUSEN
BYRON F. BURCH, JR.

BY [signature]

ATTORNEY

United States Patent Office 3,487,368

Patented Dec. 30, 1969

3,487,368

VARIABLE LENGTH ACCUMULATOR IN A DATA PROCESSING SYSTEM

Richard A. Boennighausen, Phoenix, and Byron F. Burch, Jr., Scottsdale, Ariz., assignors to General Electric Company, a corporation of New York Filed Apr. 14, 1965, Ser. No. 448,195
Int. Cl. G11b *13/00;* G06f *7/00, 15/00*
U.S. Cl. 340—172.5 8 Claims

ABSTRACT OF THE DISCLOSURE

Apparatus is included in a data processing system for varying the effective length of the accumulator of an arithmetic unit for a given data processing operation.

This invention relates to data processing systems and, in particular, to arithmetic units of data processing systems.

An arithmetic unit of a data processing system normally has as one of its components a storage unit called the accumulator. The accumulator of the arithmetic unit is normally employed to store the result of an arithmetic operation in the adder, which is another component of the arithmetic unit. The accumulator is also employed to temporarily store operands words which are to be processed in an arithmetic operation performed by the arithmetic unit, or which are to be processed by another type of operation in the data processing system. The accumulator may also serve to store the result of a data processing operation other than an arithmetic operation performed by the arithmetic unit. Thus, execution of an instruction by the data processing system may modify or employ the contents of the accumulator.

It is often desirable in a data processing system to perform arithmetic operations on data fields having different lengths. For example, it may be necessary during data processing operations to add a data field comprising a single word of information to another data field comprising three words of information. In prior art data processing systems, the sizes of the data fields on which the arithmetic operation were to be performed were required to be equal. In the example, the data field comprising the single word of information would therefore be combined with two additional words comprising zeros to form a data field of three words for addition to the other three-word data field. Alternatively, additional instructions were required to process the data fields of different lengths. This arrangement is wasteful of data processing time and memory storage locations. Conceivably, the data processing system could be provided with specific instructions, for example add single to triple, which would permit an arithmetic operation on data fields having different lengths. As a practical matter, however, the limited number of operation codes available in a data processing system for instruction identification prohibits provision of operation codes covering every combination of data field lengths which may be encountered during arithmetic operations. Accordingly, it is desirable to provide arrangement to facilitate the performance of arithmetic operations on data fields having different lengths.

The arithmetic units of many data processing systems include accumulators having a capacity of an integral number of fixed word lengths. Such an accumulator permits data fields having lengths greater than a single word to be conveniently processed. In processing data fields having lengths less than the capacity of the accumulator, the data processing operations related to the high-order word locations of the accumulator are performed, even though meaningful data is not present. Such an arrangement is wasteful of data processing time. Accordingly, it is desirable to provide an accumulator arrangement in the arithmetic unit of a data processing system which permits adjustment of the effective length of the accumulator for a given data processing operation.

It is therefore an object of this invention to provide an improved arithmetic unit in a data processing system.

It is an object of the invention to provide an improved accumulator arrangement in the arithmetic unit of a data processing system.

It is another object of the invention to provide accumulator apparatus in a data processing system which facilitates arithmetic operations on data fields having different lengths.

It is another object of the invention to provide accumulator apparatus in a data processing system which facilitates the processing of variable length data fields in a fixed word length data processing system.

It is a further object of the invention to provide accumulator apparatus in a data processing system which permits limitation of the effective length of the accumulator to less than the full length for a given data processing operation.

It is a further object of the invention to provide accumulator apparatus in a data processing system which conserves data processing time and memory locations during data processing operations involving data fields having different lengths.

It is a further object of this invention to provide accumulator apparatus in a data processing system which reduces the data processing time required for processing data fields having lengths less than the capacity of the accumulator.

The foregoing objects are achieved, in the illustrated embodiment of the invention, by providing a two-bit register, termed the Accumulator Length Indicator Register, which stores the working or effective length of the four-word accumulator in memory. The working length of the accumulator may be set to single, double, triple or quadruple by presetting the flip-flops of the Accumulator Length Indicator Register to predetermined states. The accumulator working length, as defined by the Accumulator Length Indicator Register, designates the accumulator words involved in performing a given data processing function. The number of words in the data field being processed may be greater than, equal to or less than the number of words in the working accumulator, depending upon the data processing function being performed.

This application is one of several applications covering an entire computer system. Portions of the apparatus herein disclosed are inventions of the following:

Thomas J. Beatson, David E. Keefer, Richard M. Rojko, and John E. Wilhite, as defined by the claims of their application, Ser. No. 446,067, filed Apr. 6, 1965;

Thomas J. Beatson, Frank J. Bolye, Byron F. Burch, Jr., Robert D. Hunter, and Daniel W. Scott, as defined by the claims of their application, Ser. No. 448,194, filed Apr. 14, 1965;

Robert D. Hunter, Robert A. Perrine, and John E. Wilhite, as defined by the claims of their application, Ser. No. 448,196, filed Apr. 14, 1965;

Edwin W. Herron, Robert D. Hunter, and John E. Wilhite, as defined by the claims of their application, Ser. No. 448,197, filed Apr. 14, 1965;

Frank J. Boyle and John E. Wilhite, as defined by the claims of their application, Ser. No. 448,537, filed Apr. 15, 1965;

Edwin W. Herron, Robert D. Hunter, and David E. Keefer, as defined by the claims of their application, Ser. No. 448,538, filed Apr. 15, 1965;

Edwin W. Herron, Robert D. Hunter, and David E. Keefer, as defined by the claims of their application, Ser. No. 448,539, filed Apr. 15, 1965;

Robert D. Hunter, David E. Keefer, and John E. Wilhite, as defined by the claims of their application, Ser. No. 448,540, filed Apr. 15, 1965; and David E. Keefer, as defined by the claims of his application Ser. No. 448,541, filed Apr. 15, 1965. All of the above applications are assigned to the assignee of the present application.

DESCRIPTION OF DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

DATA PROCESSING SYSTEM—GENERAL

Figure 1:
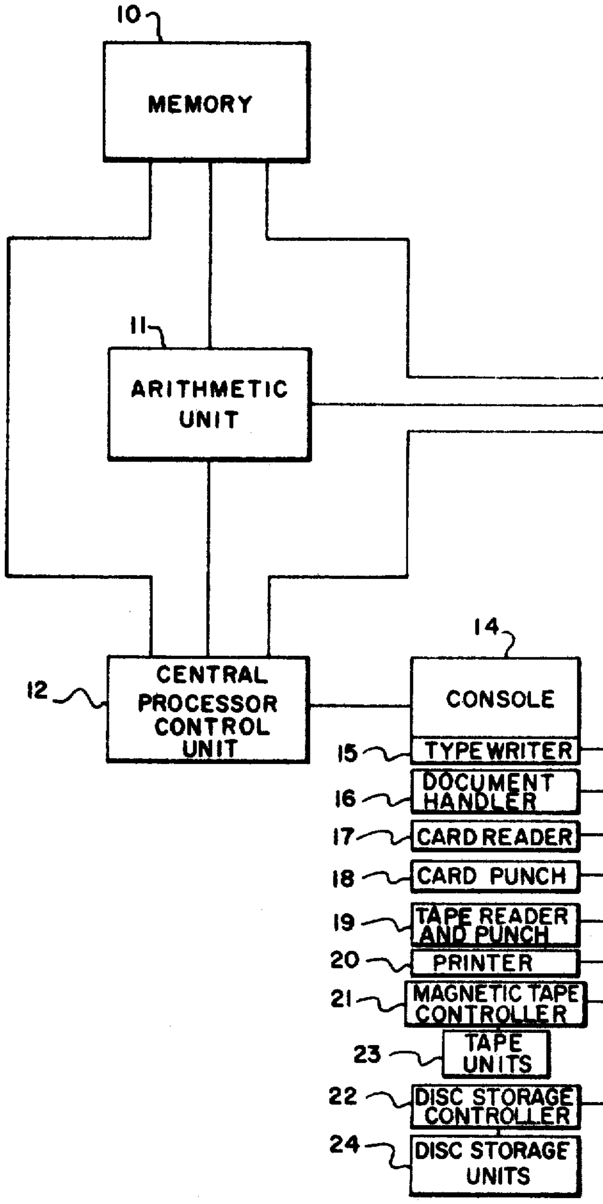
FIGURE 1 is a block diagram of the data processing system to which the instant invention is applicable.

With reference to FIG. 1, the illustrated data processing system comprises a Central Processor and a plurality of peripheral subsystems. The major units of the Central Processor are Memory 10, Arithmetic Unit 11, Central Processor Control Unit 12, Input/output Control Unit 13 and Console 14. In the description, the term Program Processor is applied to the portion of the Central Processor consisting of the Arithmetic Unit 11, the Central Processor Control Unit 12 and the Console 14. The peripheral subsystems which are used with the Central Processor to process data include Typewriter 15 which is associated with Console 14, Document Handler 16, Card Reader 17, Card Punch 18, Perforated Tape Reader/Punch Unit 19, Printer 20, Magnetic Tape Controller 21 and Disc Storage Controller 22. Magnetic Tape Controller 21 can control a plurality of Magnetic Tape Units 23 and Disc Storage Controller 22 can control a plurality of Disc Storage Units 24. Any combination of these peripheral subsystems may be employed with the Central Processor to perform a desired data processing function. The lines interconnecting the various components illustrated in FIG. 1 represent symbolically paths of data and control signals.

The Central Processor responds to a plurality of distinct instructions which are supplied in the sequential order necessary to perform a particular data processing operation. Memory 10 stores data words which are to be processed, data words which are the result of processing, instruction words and auxiliary words for addressing and control. The accumulator of the Central Processor is also located in Memory 10.

Arithmetic unit 11 performs binary and decimal arithmetic operations. Central Processor Control Unit 12 controls the sequence of events required for instruction execution in the Central Processor. Arithmetic Unit 11 and Central Processor Control Unit 12, which together comprises the Program Processor, contain the logical elements necessary to access Memory 10 and to perform all operations required for instruction execution. Arithmetic Unit 11 and Central Processor Control Unit 12 communicate with Memory 10 to obtain instruction words, auxiliary words, data words on which operations are to be performed and control signals for synchronizing the Program Processor timing with operations in memory 10.

Input/output Control Unit 13 provides for orderly sequencing of data transfers between Memory 10 and the plurality of peripheral subsystems and serves to transmit instructions from the Central Processor to the peripheral subsystems. The Input/output Control Unit also monitors peripheral subsystem operating conditions. Communication between the Central Process and the various peripheral subsystems occurs through a plurality of channels which are included in the Input/Output Control Unit 13, each channel being associated with one peripheral subsystem.

Console 14, in conjunction with Typewriter 15, permits operator control and communication with the Central Processor. The Console includes switches for controlling Central Processor power and program loading, for initiating the halting Central Processor operation and for resetting alert conditions.

For a complete description of the system of FIGURE 1 and of the present invention which is embodied in such system, reference is made to U.S. Patent 3,368,205, Hunter et al., issued Feb. 6, 1968, and assigned to the assignee of the present invention. More particularly, FIGURES 12 and 24 of the drawings and column 96, lines 26–75, column 97, and column 98, lines 1–57 are incorporated herein by reference and are made a part of the instant patent application.

What is claimed as new and desired to be secured by Letters Patent of the United States is:

1. In a data processing system, the combination comprising: an accumulator including a plurality of adjacent storage locations, a predetermined storage location of said plurality being designated the least-significant storage location of said accumulator with successive storage locations of said accumulator being designated storage locations of successively greater significance, register means for designating the least-significant storage location and a selected number of successive additional storage locations of said accumulator as effective accumulator word storage locations, a processing unit, means responsive to said register means for transferring in parallel the contents of the effective accumulator word storage locations to said processing unit during data processing operations, and means for changing the contents of said register means to effect a corresponding change in the number of effective accumulator word storage locations of said accumulator.

2. In a data processing system for processing fixed length data items, the combination comprising: an accumulator including a plurality of storage locations, each of said storage locations having a capacity of one data item, register means for designating a predetermined number of said storage locations of said accumulator as effective accumulator word storage locations, a processing unit, means responsive to said register means for transferring in parallel the contents of the effective accumulator word storage locations to said processing unit during data processing operations, and means for changing the contents of said register means to effect a corresponding change in the number of effective accumulator word storage locations of said accumulator.

3. In a data processing system, the combination comprising: an accumulator including a plurality of storage locations, register means for designating a predetermined number of said storage locations as effective accumulator word storage, locations, said effective accumulator word storage locations containing a first data field of predetermined length, data storage means for storing a second data field having a length different from that of the first data field, a processing unit, and means for transferring the second data field from said data storage means to said processing unit and responsive to said register means for transferring the first data field from the effective accumulator word storage locations of said accumulator to said processing unit during a data processing operation.

4. In a data processing system for processing fixed length data items, the combination comprising: an accumulator including a plurality of adjacent storage locations, a predetermined storage location of said plurality being designated the least-significant storage location of said accumulator with successive storage locations of said accumulator being designated storage locations of successively greater significance, each of said storage locations having a capacity of one data item, register means for designating the least-significant storage location and a selected number of successive additional storage locations of said accumulator as effective accumulator storage locations, said effective accumulator storage locations containing a first data field comprising a predetermined number of data items, data storage means for storing a second data field comprising a number of data items different from that of the first data field, a processing unit, means for transferring the second data field from said data storage means to said processing unit and responsive to said register means for transferring the first data field from the effective accumulator storage locations of said accumulator to said processing unit during a data processing operation, and means for changing the contents of said register means to effect a corresponding change in the number of effective accumulator storage locations of said accumulator.

5. In a data processing system, the combination comprising: a memory including a plurality of singly addressable storage locations, an accumulator including a plurality of storage locations in said memory, register means for designating predetermined ones of said storage locations of said memory as effective accumulator word storage locations, and means for changing in parallel the contents of said register means to effect a corresponding change in the number of effective adjacent accumulator word storage locations of said memory.

6. In a data processing system, the combination comprising: a memory including a plurality of singly addressable storage locations, an accumulator including a plurality of adjacent storage locations in said memory for storing a plurality of information processing words, register means designating a predetermined number of successive ones of said storage locations of said memory as effective accumulator word storage locations, and means for changing the contents of said register means to effect a corresponding change in the number of adjacent effective accumulator word storage locations of said memory as a multiple of the number of words stored.

7. In a data processing system, the combination comprising: an accumulator including a plurality of singly addressable adjacent storage locations for storing a plurality of information processing words, register means for designating predetermined ones of said storage locations of said accumulator as effective accumulator words storage locations, a processing unit, means responsive to said register means for transferring the contents of the effective accumulator word storage locations to said processing unit during data processing operations, and means for changing the contents of said register means to effect a corresponding quantitative change in the effective adjacent accumulator word storage locations of said accumulator.

8. In a data processing system, the combination comprising: an accumulator including a plurality of adjacent storage locations for storing a plurality of information processing words, register means for designating predetermined successive ones of said storage locations of said accumulator as effective accumulator word storage locations, a processing unit, means responsive to said register means for transferring the contents of the effective accumulator storage locations to said processing unit during data processing operation, and means for changing the contents of said register means to effect a predetermined corresponding change in the quantitative number of effective accumulator storage locations of said accumulator, said corresponding change being a multiple of the number of effective accumulator storage locations.

References Cited

UNITED STATES PATENTS

| | | | |
|---|---|---|---|
| 3,166,668 | 1/1965 | Marsh | 235—157 |
| 3,161,763 | 12/1964 | Glaser | 235—157 |
| 3,160,857 | 12/1964 | Frush | 340—172.5 |
| 3,071,739 | 1/1963 | Runyon | 333—18 |
| 3,026,036 | 3/1962 | Haanstra et al. | 235—157 |
| 3,012,723 | 12/1961 | Goertzel et al. | 235—157 |
| 2,943,788 | 7/1960 | Hearsum et al. | 235—61.9 |
| 2,923,469 | 2/1960 | Woodbury | 235—61.9 |
| 2,902,675 | 9/1959 | Shaw et al. | 340—174 |
| 3,077,580 | 2/1963 | Underwood | 340—172.5 |

OTHER REFERENCES

IBM Reference Manual 1401 Data Processing System, pp. 9, 15, 28, 29, 82; Patent Office date, Jan. 15, 1962, IBM date, October 1960.

GARETH D. SHAW, Primary Examiner